(12) United States Patent
Knutsen et al.

(10) Patent No.: US 11,982,393 B2
(45) Date of Patent: May 14, 2024

(54) CLAMP DEVICE AND METHOD FOR REPAIRING A DAMAGED PART OF A PIPE SECTION, AND USE OF SUCH CLAMP DEVICE

(71) Applicant: IK-NORWAY AS, Stavanger (NO)

(72) Inventors: Christian Knutsen, Stavanger (NO); Pål Espen Antonsen, Stavanger (NO); Bozidar Sevic, Stavanger (NO)

(73) Assignee: IK-NORWAY AS, Stavanger (NO)

( * ) Notice: Subject to any disclaimer, the term of this patent is extended or adjusted under 35 U.S.C. 154(b) by 428 days.

(21) Appl. No.: 17/427,835

(22) PCT Filed: Feb. 3, 2020

(86) PCT No.: PCT/NO2020/050026
§ 371 (c)(1),
(2) Date: Aug. 2, 2021

(87) PCT Pub. No.: WO2020/162760
PCT Pub. Date: Aug. 13, 2020

(65) Prior Publication Data
US 2022/0146036 A1     May 12, 2022

(30) Foreign Application Priority Data
Feb. 5, 2019   (NO) .................................. 20190159

(51) Int. Cl.
*F16L 55/17*     (2006.01)
(52) U.S. Cl.
CPC ................................ *F16L 55/171* (2013.01)
(58) Field of Classification Search
CPC ...... F16L 55/17; F16L 55/171; F16L 55/1715
(Continued)

(56) References Cited

U.S. PATENT DOCUMENTS

| 436,574 A | 9/1890 | Bramwell |
| 1,478,172 A * | 12/1923 | Clark ............... F16L 55/172 |
| | | 251/339 |

(Continued)

FOREIGN PATENT DOCUMENTS

| CN | 105042273 | 11/2015 |
| CN | 107940162 | 4/2018 |

(Continued)

OTHER PUBLICATIONS

Norwegian Search Report for No. 20190159, dated Feb. 2, 2019.
(Continued)

*Primary Examiner* — Patrick F Brinson
(74) *Attorney, Agent, or Firm* — Andrus Intellectual Property Law, LLP (57) ABSTRACT

A clamp device is for repairing a damaged part of a pipe section. The clamp device has a patch member and a support structure having a clamp body supporting the patch member. The clamp device has a first engagement member configured to engage with a first part of the pipe section and a second engagement member configured to engage with a second part of the pipe section. The clamping device has a first mechanism configured to engage the first engagement member with the first part and compress the patch member at the damaged part, and a second mechanism configured to engage the second engagement member with the second part and induce a compressive force between the first engagement member and the second engagement member.

18 Claims, 4 Drawing Sheets

(58) Field of Classification Search
USPC .............................. 138/99, 97; 285/342, 373
See application file for complete search history.

(56) References Cited

U.S. PATENT DOCUMENTS

| | | | | |
|---|---|---|---|---|
| 1,617,812 | A * | 2/1927 | Hutchings | ............ F16L 55/1705 138/99 |
| 1,728,250 | A * | 9/1929 | Pike | .................... F16L 55/1725 138/99 |
| 1,964,642 | A * | 6/1934 | Mccoy | .................. F16L 55/172 285/337 |
| 2,936,186 | A * | 5/1960 | Dunmire | ............... F16L 55/172 285/373 |
| 2,977,995 | A * | 4/1961 | Walpole | .................. F16L 33/04 269/130 |
| 3,189,970 | A * | 6/1965 | Barr | ...................... F16L 55/172 24/284 |
| 4,417,755 | A * | 11/1983 | Gittleman | ............. F16L 21/065 285/423 |
| 4,889,370 | A * | 12/1989 | Firestone | .............. F16L 55/171 285/342 |
| 2017/0030505 | A1 | 2/2017 | Bowie | |
| 2022/0090724 | A1* | 3/2022 | Jeaurond | ................. F16L 55/17 |

FOREIGN PATENT DOCUMENTS

| | | |
|---|---|---|
| CN | 108180345 | 6/2018 |
| EP | 2674655 | 12/2013 |
| EP | 2816271 | 12/2014 |
| EP | 3124847 | 2/2017 |
| GB | 2200702 | 8/1988 |

OTHER PUBLICATIONS

International Search Report and the Written Opinion for PCT/NO2020/050026, dated Jun. 4, 2020.
Supplementary European Search Report for EP Application No. 20752121, dated Sep. 13, 2022.

* cited by examiner

CLAMP DEVICE AND METHOD FOR REPAIRING A DAMAGED PART OF A PIPE SECTION, AND USE OF SUCH CLAMP DEVICE

CROSS-REFERENCE TO RELATED APPLICATIONS

This application is the U.S. national stage application of International Application PCT/NO2020/050026, filed Feb. 3, 2020, which international application was published on Aug. 13, 2020, as International Publication WO 2020/162760 in the English language. The International Application claims priority of Norwegian Patent Application No. 20190159, filed Feb. 5, 2019. The international application and Norwegian application are both incorporated herein by reference, in entirety.

INTRODUCTION

The present invention relates to a clamp device for repairing a damaged part of a pipe section. In particular, the invention relates to a clamp device for subsea repair operation of pipe sections. The clamp device is adapted to be arranged at the damaged part and comprises a patch member and a support structure comprising a clamp body supporting the patch member.

The present invention further relates to a method for repairing a damaged part of a pipe section and use of the clamp device.

PRIOR ART

Prior art clamp devices are used for repairing damaged part of a pipe sections. The clamp is arranged around the pipe section at the damaged part so that the patch member, for example made of an elastomer, such as rubber, is covering the damaged part. The clamp is fixed, wherein compressive forces are subjected to patch member and the pipe section in direction of its central axis. Thereby, a leakage of a medium within the pipe section is prevented.

In order to avoid crack propagation, a further clamp, may be arranged around the damaged part of the pipe section. The further clamp has the function of subjecting the damaged part to compressive forces in the axial direction of the pipe section and restores the structural strength of pipe section.

A problem with prior art patch clamps is that the operation of arranging the patch clamp over the damaged part involves many steps of tightening bolts of a bolt arrangement. This is in particular a problem when installing the patch clamps on a subsea pipeline by means of a Remotely Operated Vehicle (ROV). A further problem with prior art patch clamps is that a separate structural clamp needs to be installed for providing the compressive forces in the axial direction of the pipe section.

SUMMARY OF THE INVENTION

The invention has for its object to remedy or to reduce at least one of the drawbacks of the prior art, or at least provide a useful alternative to prior art.

In particular, a first object of the invention is to provide an improved clamp device that enables a damaged part of a pipe section to be repaired while preventing crack propagation at the damaged part. A second object of the invention is to provide an improved clamp device that facilitated installation on a subsea pipeline, such as by means of a Remotely Operated Vehicle (ROV).

These objects are obtained by means of a clamp device for repairing a damaged part of a pipe section. The clamp device is adapted to be arranged at the damaged part and comprises a patch member and a support structure comprising a clamp body supporting the patch member. The clamp device is characterized in that it comprises a clamping arrangement comprising a first engagement member configured to engage with a first part of the pipe section adjacent to the damaged part, and a second engagement member configured to engage with a second part of the pipe section adjacent to the damaged part, which first and second part of the pipe section are on opposite sides of the damaged part in respect to the extension of the pipe section, wherein the clamping arrangement comprises a first mechanism, configured in a first step of operation of the clamp device, to engage the first engagement member with the first part of the pipe section and compress the patch member at said damaged part, wherein the clamping arrangement further comprises a second mechanism, configured in a second step of operation of the clamp device, to engage the second engagement member with the second part of the pipe section and induce a compressive force between the first engagement member and the second engagement member.

By means of the clamping arrangement comprising the first mechanism and the second mechanism, the clamp device is configured to be operated so that the damaged part is covered and prevented from leakage by means of the patch member, and the first part and second part of the pipe section pushed together so that the crack propagation at the damaged part is prevented.

The clamp device enables above functionality by means of that, in the first step of operation, the first mechanism is activated and induces the first engagement member to engage with the first part of the pipe section and the patch member to be compressed at the damaged part. Thereby, a leakage of a medium in the pipe section is prevented.

The clamp further enables above functionality by means of that, in the second step of operation, the second mechanism is activated and induces the second engagement member to engage with the second part of the pipe section and push the second engagement member toward the first engagement member. Thereby, crack propagation at the damaged part of the pipe section is prevented and the structural strength of pipe section is restored.

The first engagement member is displaceable between a disengaged state and an engaged state by means of the first mechanism. In the disengaged state, the first engagement member lacks engagement or essential engagement with the first pipe section, which enables the clamp device to be adjusted to correct, where the first engagement member is located over the first part of the pipe section and the second engagement member is located over the second part of the pipe section. In the engaged state, the first engagement member forms a firm attachment with the first pipe section.

Correspondingly, the second engagement member is displaceable between a disengaged position and an engaged position by means of the second mechanism. In the disengaged position, the first engagement member lacks engagement or essential lacks engagement with the second pipe section. In the engaged state, the second engagement member forms a firm attachment with the second pipe section.

In the process of engaging the first engagement member, the first mechanism compresses the patch member at the damaged part. Thereby, the patch member seals the damaged part and prevents leakage of a medium in the pipe section.

The clamping arrangement of the invention has the advantage of enabling both repair of the damaged part of a pipe section and prevention of degradation of the damaged part in form of crack propagation.

According to an embodiment of the invention, clamping arrangement is connected to the body of the clamp device, wherein the clamping arrangement is held by the body.

According to an embodiment of the invention, the first mechanism comprises a first displacement member and a first setting arrangement for inducing a displacement of the displacement member from an outside of the clamp device, wherein the first displacement member is configured to act on the first engagement member and the patch member, thereby engaging the first engagement member with the first part of the pipe section and compressing the patch member.

The first setting arrangement enables the first mechanism to be activated so the first engagement member engages with the first part of the pipe section and the patch member is compressed at the damaged part of the pipe section. It shall be understood that the first displacement member is configured to act on the first engagement member and the patch member by means of directly contact or by means of an intermediate structure providing the contact.

According to an embodiment of the invention, the first displacement member comprises a first primary wedged portion and the first engagement member comprises a first secondary wedged portion complementary to the first primary wedged portion, wherein first displacement member is configured to be displaced so that the first primary wedged portion acts on the first secondary wedged portion, thereby engaging the first engagement member with the first part of the pipe section.

By means of the first primary wedged portion of the first displacement member and first secondary wedged portion of the first engagement member, a wedged engagement between the first engagement member and the first portion of the pipe section is obtained. The wedge engagement has the advantage of providing a firm engagement with the first portion of the tubing.

According to an embodiment of the invention, the clamp body comprises a first wall portion and a second wall portion defining a recess for the patch member, wherein the first wall portion and the second wall portion are displaceable in respect to each, wherein the first mechanism is configured to induce a compressive force between the first wall portion and second wall portion, thereby displacing the first wall portion and second wall portion in respect to each other and compressing the patch member in the recess at said damaged part. By means of acting on the first wall portion and the second wall portion, the spacing of the recess is restricted together with the patch member arranged therein.

According to an embodiment of the invention, the first wall portion and second wall portion are opposite parts of the clamp body defining the recess.

According to an embodiment of the invention, the clamp body comprises a slide assembly enabling a sliding displacement of the first wall portion and second wall portion in respect to each other.

According to an embodiment of the invention, the first mechanism comprises a first compression member acting on the first wall portion and second compression member acting on the second wall portion, wherein the first mechanism is configured to induce a force that pushes the first compression member and the second compression member together.

The first compression member is for example the first displacement member as discussed. The second compression member is for example the collar on the setting bold as discussed. It shall be understood that other configurations are applicable to displace the first wall portion and second wall portion in respect to each other.

According to an embodiment of the invention, the second mechanism is configured to engage the second engagement member with the second part of the pipe section and push one of the first engagement member and the second engagement member toward the other of the first engagement member and the second engagement member.

According to an embodiment of the invention, the second mechanism comprises a second displacement member and a second setting arrangement for inducing a displacement of the second displacement member from an outside of the clamp device, wherein the second displacement member is configured to act on the second engagement member, thereby engaging the second engagement member with the second part of the pipe section and pushing the second engagement member toward the first engagement member.

The second setting arrangement enables the second mechanism to be activated so the second engagement member engages with the second part of the pipe section and pushing the second engagement member toward the first engagement member, thereby pushing the first portion and second portion of the tube section together. It shall be understood that the second displacement member is configured to act on the second engagement member and the patch member by means of directly contact or by means of an intermediate structure providing the contact.

According to an embodiment of the invention, the second displacement member is configured to be displaced in direction towards the first engagement member by means of the second setting arrangement, thereby pushing the second engagement member towards the first engagement member. By means of pushing the first engagement member and second engagement member toward each other also the first portion and second portion of the tube section is pushed towards each other, which prevents crack propagation at the damaged part.

According to an embodiment of the invention, the second displacement member comprises a second primary wedged portion and the second engagement member comprises a second secondary wedged portion complementary to the second primary wedged portion, wherein second displacement member is configured to be displaced so that the second primary wedged portion acts on the second secondary wedged portion, thereby engaging the second engagement member with the second part of the pipe section.

By means of the second primary wedged portion of the second displacement member and second secondary wedged portion of the second engagement member, a wedged engagement between the second engagement member and the second portion of the pipe section is obtained. The wedge engagement has the advantage of providing a firm engagement with the second portion of the tubing.

According to an embodiment of the invention, the first displacement member and the second displacement member comprises a first displacement body with a threaded first opening, and wherein the clamping arrangement comprises a threaded setting bolt extending through the first opening, which setting bolt comprises a collar engaging with the clamp body, thereby inducing a displacement of said first displacement member or said second displacement member upon rotation of the setting bolt, wherein the other of the first displacement member and the second displacement member comprises a second displacement body with a second opening, and wherein the threaded setting bolt comprises a collar engaging with the clamp body, and wherein the clamping arrangement comprises a setting nut on the setting bolt configured to engage with other of the first displacement member and second displacement member, thereby inducing a displacement of other of the first displacement member and second displacement member upon rotation of the setting nut.

According to an embodiment of the invention, an end of the setting bolt extends to an outside of the clamp device and the setting nut is arranged at said end of the setting bolt.

By means of the setting bolt and the setting nut arranged according to above, the end of the setting bolt and the setting nut are in vicinity of each other. The first mechanism is activated by acting on the end of the setting bolt and the second mechanism is activated by acting on the setting nut. Accordingly, the arrangement enables facilitates the first and second step of operation to be performed quickly and with merely small displacement, such as by an operator or a remotely operated vehicle (ROV) acting on the first and second activation member.

For example, the first displacement member comprises the first displacement body with the threaded first opening, and wherein the threaded setting bolt extends through the first opening. The first opening comprises an internal threading and the setting bolt comprises an external threading, which internal and external threading are configured to engage with each other. By means of rotation of setting bolt, a displacement of the first displacement member is induced.

Correspondingly, the second displacement member comprises the second displacement body with the second opening, wherein the setting nut on the setting bolt is configured to engage with second displacement member. The setting nut comprises an internal threading and the setting bolt comprises the external threading, which internal and external threading are configured to engage with each other.

By means of rotation of the setting nut, a displacement of the second displacement member is induced. As described above, it shall be understood that the reversed configuration is applicable regarding the displacement of the two displacement members.

According to an embodiment of the invention, the first displacement member comprises a first displacement body with a first opening, and wherein the first mechanism comprises a threaded setting bolt comprising a collar engaging with the clamp body and a first setting nut on the setting bolt configured to engage with first displacement member, thereby inducing a displacement of the first displacement member upon rotation of the first setting nut.

According to an embodiment of the invention, the second displacement member comprises a second displacement body with a second opening, and wherein the second mechanism comprises a threaded setting bolt comprising a collar engaging with the clamp body and a second setting nut on the setting bolt configured to engage with second displacement member, thereby inducing a displacement of the second displacement member upon rotation of the second setting nut.

According to an embodiment of the invention, the first mechanism comprises a first displacement member configured to engage with the first wall portion of the clamp body and comprising a first displacement body with a threaded first opening, wherein the first mechanism further comprises a threaded setting bolt extending through the first opening and a collar configured to engage with the second wall portion of the clamp body, thereby inducing a compressive force between the first wall portion and the second wall portion upon rotation of the first setting bolt.

By means of the rotation setting bolt, the compressive force is induced between the first wall portion and the second wall portion. The embodiment has the advantage of enabling the compressive force to be generated in a simple manner. Thereby, the patch member is compressed at the damaged part of the tube section.

According to an embodiment of the invention, the first mechanism comprises a first displacement member configured to engage with the first wall portion of the clamp body and comprising a first displacement body with a threaded first opening, wherein the first mechanism further comprises a threaded setting bolt extending through the first opening and a collar configured to engage with the second wall portion of the clamp body, thereby inducing a compressive force between the first wall portion and the second wall portion upon rotation of the first setting bolt. Alternatively, the first displacement member is displaced by a setting nut as discussed above.

According to an embodiment of the invention, a first end of the setting bolt extends to an outside at a first side of the clamp device and the first setting nut is arranged at said first end of the setting bolt, and wherein a second end of the setting bolt extends to an outside at a second side of the clamp device and the second setting nut is arranged at said second end of the setting bolt, wherein the first side and second side are opposite sides of the clamp device.

By means of the first and second setting bolt according to above, the activation of the first and second mechanism are on opposite sides. Thereby, the risk of erroneously activating the incorrect mechanism is reduced.

According to an embodiment of the invention, the first setting arrangement and the second setting arrangement comprises a respective setting member for inducing the displacement of the respective first displacement member and the second displacement member, wherein setting members are arranged in vicinity of each other at said outside.

The setting members are for example a threaded setting bolt and a setting nut as discussed in above embodiments. However, it shall be understood that other configurations are possible that enables the two setting members to the be arranged in vicinity to each other. By arranging the setting members in vicinity of each other facilitates, the first and second step of operation to be performed quickly and with merely small displacement, such as by an operator or a remotely operated vehicle (ROV) acting on the first and second activation member.

According to an embodiment of the invention, said first step and second step of operation are individual steps, where the second step of operation is subsequent to the first step of operation.

According to an embodiment of the invention, said first step of operation comprises a first sub-step of engaging the first engagement member and a second sub-step of compressing the patch member, wherein the second-sub step is subsequent to the first sub-step.

By means of the first sub step of engaging the first engagement member with the first part of the tube section prior to the second sub step of compressing the patch member, it is assured that the position of the clamp device is unchanged and that the patch member accordingly is compressed at the damaged part of the tube section.

According to an embodiment of the invention, said second step of operation comprises a first sub-step of engaging the second engagement member and a second sub-step of inducing a compressive force between the first engagement member and the second engagement member, wherein the second sub step is subsequent to the first sub-step.

By means of the first sub step of engaging the second engagement member with the second part of the tube section prior to the second sub step of inducing a compressive force between the first engagement member and the second engagement member, it is assured that engagement has been formed with the second tube section prior to that compressive force between the first engagement member and the second engagement member is induced.

According to an embodiment of the invention, the patch member mainly comprises an elastomer, such as rubber. The rubber is for example, natural rubber or synthetic rubber.

According to an embodiment of the invention, the clamp device is separated in two or more portions, or a single part with a hinged opening, for enabling arranging clamp device around the full circumference of the tube section. Alternatively, according to an embodiment of the invention, the clamp device is in a single part configured to be arranged around a portion of circumference of the tube section. The clamp device is configured to form a single unit when installed on the pipe section.

The above object of the invention is further obtained by means of a method for repairing a damaged part of a pipe section by means of a clamp device according to any of above embodiments, wherein the method comprises:
  arranging the clamp device on said damaged part of the pipe section so that the patch member is positioned at the damaged part, the first engagement member is positioned at the first part of the pipe section, and the second engagement member is positioned at the second part of the pipe section,
  activating the first mechanism, wherein the first engagement member engages with the first part of the pipe section and the patch member is compressed at said damaged part, and
  activating the second mechanism, wherein the second engagement member engages with the second part of the pipe section and the second engagement member is pushed toward the first engagement member.

The above object of the invention is further obtained by means of use of a clamp device according to any of above embodiments.

BRIEF DESCRIPTION OF THE FIGURES

In the following is described examples of preferred embodiments of the invention illustrated in the accompanying drawings, wherein.

DETAILED DESCRIPTION OF THE INVENTION

Figure 1:
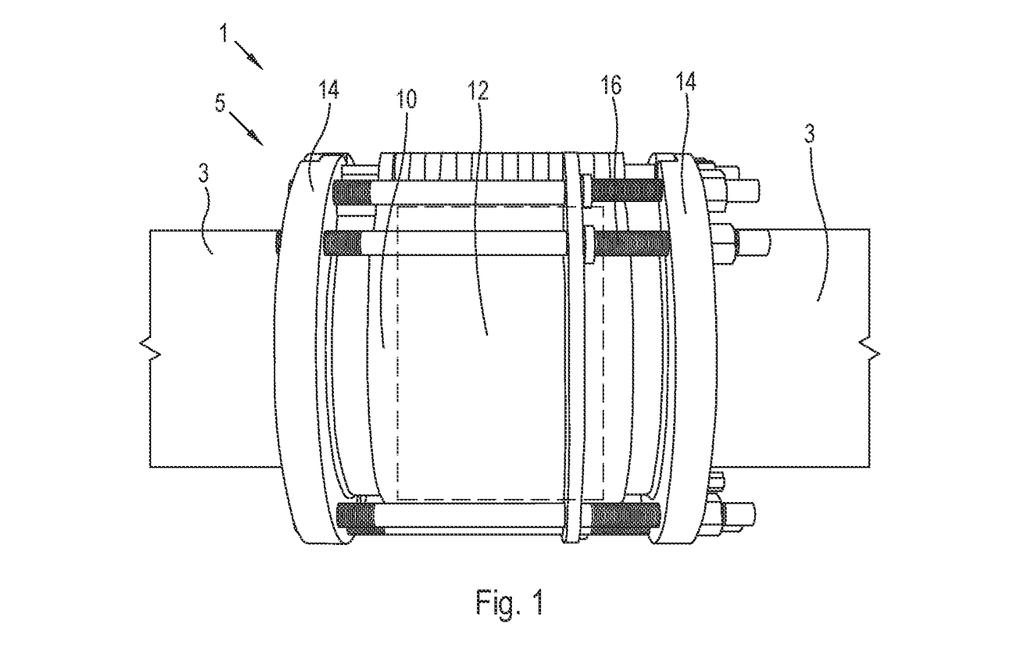
FIG. 1 discloses a clamp device according to an embodiment of the invention, wherein the clamp device is arranged at a damaged part of a pipe section.

In FIG. 1 is a clamp device 1 according to an embodiment of the invention discloses. The clamp device 1 is arranged at a damaged part 2 of a pipe section 3. The clamp device 1 is elongated and have a shape configured to be arranged around circumference of the pipe section 3 at the damaged part 2 of the pipe section 3. In FIG. 1, the damaged part 2 is completely hidden by the clamp device 1.

The clamp device 1 comprises a support structure 5 for holding components of the clamp device 1 together. The support structure 5 comprises clamp body 10 for holding a patch member 12. The patch member 12 is hidden by the clamp body 10 and is schematic illustrated between the doted lines in FIG. 1. The patch member 12 is configured to be compressed at the damaged part 2 of the pipe section 3 for preventing a leakage of a medium within the pipe section 3.

The support structure comprises mainly a construction material, such as steel, stainless steel, aluminium, and etcetera. In the disclosed embodiment the support structure 5 further comprises two flanges 14 at the end and support bolts 16 holding the flanges 14 together.

In the following will embodiments of the clamp device 1 be disclosed in further details.

Figure 2:
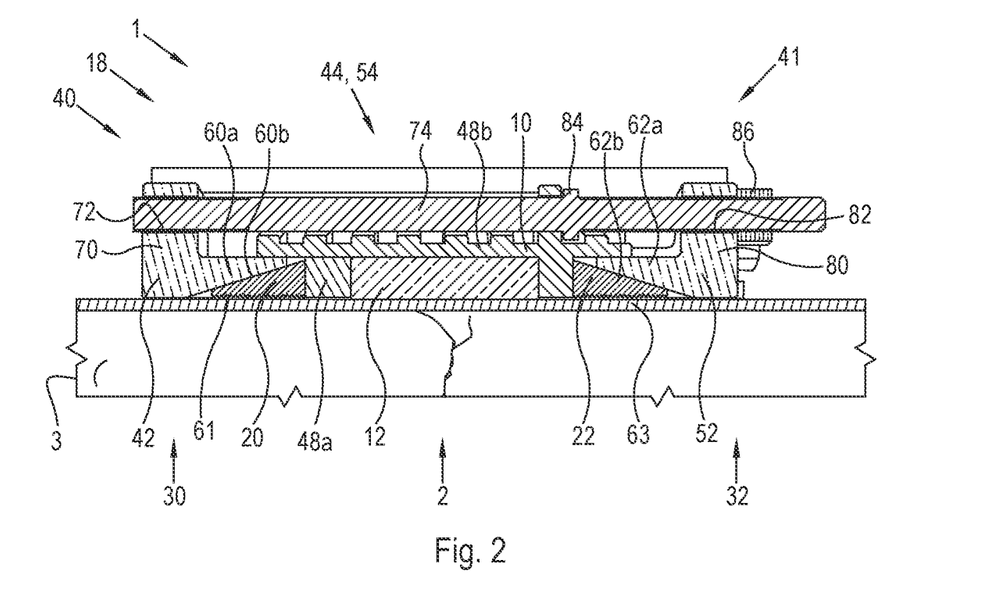
FIG. 2 discloses a cross section of an embodiment of the clamp device in FIG. 1.

In FIG. 2 is a cross second of an embodiment of the clamp device 1 in FIG. 1 disclosed. The clamp device 1 is arranged at the damaged part 2 of the pipe section 3. In FIG. 2, the damaged part 2 is illustrated as a crack in the tube section 3.

The clamp device 1 comprises a clamping arrangement 18 for repairing the damaged part 2 of the pipe section 3. The clamping arrangement 18 comprises a first engagement member 20 and a second engagement member 22. The first engagement member 20 configured to engage with a first part 30 of the pipe section 3 adjacent to the damaged part 2. Correspondingly, the second engagement member 22 is configured to engage with a second part 32 of the pipe section 3 adjacent to the damaged part 2. The first part 30 and second part 32 of the pipe section 3 are on opposite sides of the damaged part 2 in respect to the extension of the pipe section 3.

The clamping arrangement 18 comprises a first mechanism 40 and a second mechanism 41. In the disclosed embodiment, the first mechanism 40 and the second mechanism 41 have components that are common to the two mechanisms 40, 41.

The first mechanism 40 is configured to engage the first engagement member 20 with the first part 30 of the pipe section 3 and compress the patch member 12 at said damaged part 2.

The first mechanism 40 comprises a first displacement member 42 and a first setting arrangement 44 for inducing a displacement of the first displacement member 42 from an outside of the clamp device 1. The first displacement member 42 is configured to act on the first engagement member 20 and the patch member 12, thereby engaging the first engagement member 20 with an outer surface at the first part 30 of the pipe section 3 and compressing the patch member 12.

In the following, the first mechanism 40 will be discussed in further details.

Figure 4A:
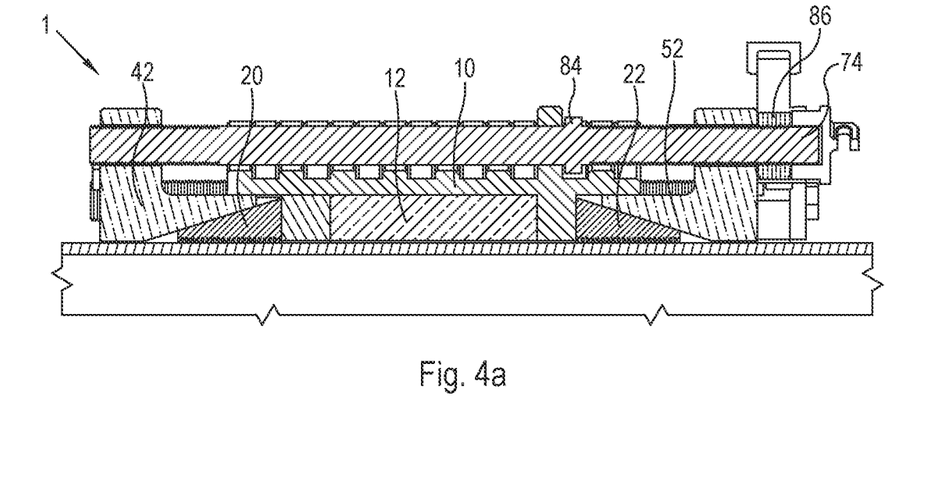
FIG. 4a discloses an example of the first mechanism and second mechanism of the clamp device in FIG. 2 in an initial stage.
Figure 4B:
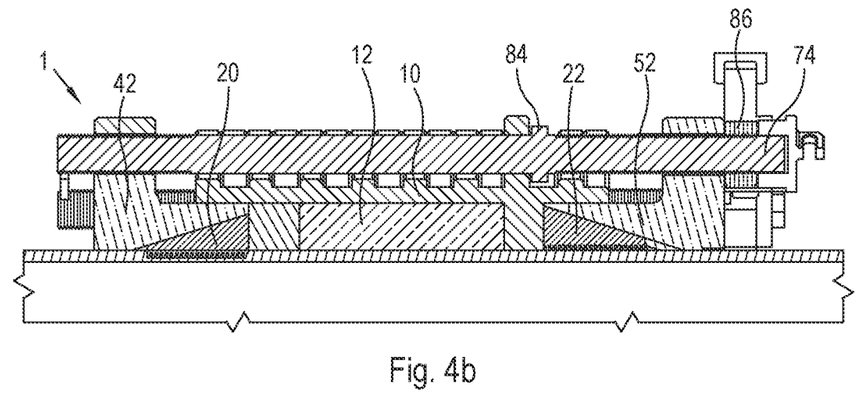
FIG. 4b discloses clamp device in FIG. 4a subsequent to a first sub step of the first step of operation, FIG. 4c discloses the clamp device in FIG. 4a subsequent to a second sub step of the first step of operation.

In FIG. 4a is an example of the first mechanism 40 and second mechanism 41 of the clamp device 1 in FIG. 2 in an initial stage disclosed. In FIG. 4b is the clamp device 1 subsequent to a first sub step of the first step of operation disclosed.

The first sub step of the first step of operation relates to the displacement of the first displacement member 42. Thereby the first engagement member 20 has formed an engagement with the first part 30 of the pipe section 3. This is schematically illustrated by the first engagement member 20 slightly displaced into the first part 30 of the pipe section 3. The second mechanism 41 is still in its initial stage.

The clamp body 10 of the clamp device 1 comprises a first wall portion 48a and a second wall portion 48b. Together, the first wall portion 48a and the second wall portion 48b defines a recess in which the patch member is arranged. The clamp body 10 is configured so that the first wall portion 48a and the second wall portion 48b are displaceable in respect to each other. By means of a displacement of the first wall portion 48a and the second wall portion 48b, the extent of the recess is adjustable.

The first mechanism 40 is configured to induce a compressive force between the first wall portion 48a and second wall portion 48b. The compressive force displaces the first wall portion 48a and second wall portion 48b in respect to each other with the result that the extent of the recess is restricted and accordingly the patch member 12 arranged therein compressed at the damaged part 2 of the tube section 3.

In the disclosed embodiment, the first displacement member 42 is configured to engage with the first wall portion 48a. As discussed in connection with the embodiment in FIG. 2, the first mechanism further comprises the first displacement body 70 with the threaded first opening 72, where the threaded setting bolt 74 extends through the first opening 72. The first mechanism further comprises the collar 84 the engages with the second wall portion 48b.

By means of rotation of the setting bolt 74, a compressive force is induced between the first displacement member 42 and the collar 84. Thereby, the first wall portion 48a and the second wall portion 48b undergo a displacement in relation to each other so that the recess is restricted and the patch member in the recess is compressed at the damaged part of the tube section.

Figure 4C:
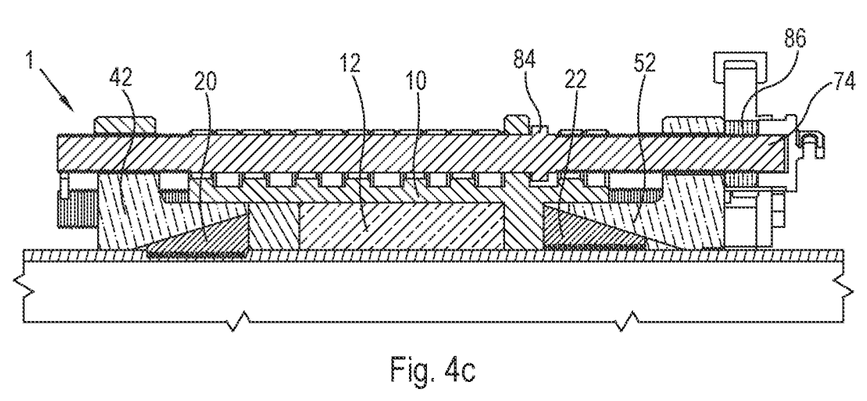

By means of the combination of the first and second sub step of the first step of operation, a firm engagement of the first engagement member 20 with the first part 30 of the pipe section 3 is formed while a possible leakage of a medium within the pipe section 3 is prevented.

In FIG. 4c is the clamp device 1 in FIG. 4a subsequent to a second sub step of the first step of operation disclosed. The second-sub step is subsequent to the first sub-step of operation. The second mechanism 41 is still in its initial stage.

In the following, the second mechanism 41 will be discussed in further details.

The second mechanism 41 is configured to engage the second engagement 22 member with the second part 32 of the pipe section 3 and induce a compressive force between the first engagement member 20 and the second engagement member 22 that is subjected to the first part 30 and second part 32 of the pipe section 3.

The second mechanism 41 comprises a second displacement member 52 and a second setting arrangement 54 for inducing a displacement of the second displacement member 52 from an outside of the clamp device 1. The second first displacement 52 member is configured to act on the second engagement member 22, thereby engaging the second engagement member 22 with an outer surface the second part 32 of the pipe section 3 and pushing the second engagement member 22 toward the first engagement member 20.

Thereby, a firm engagement of the second engagement 22 member with the second part 32 of the pipe section 3 is formed and the compressive force between the first engagement member 20 and the second engagement member 22 is induced. In that both engagement members 20, 22 are in engagement with the respective part of the tube sections, the displacement of the second engagement member 22 towards the first engagement member 20 result in that the first part 30 and the second part 32 of the tube section 3 are pushed together, thereby preventing crack propagation at the damaged part 2 of the tube section 3.

The first sub step and second sub step of operation of the first mechanism 40 are described as separate subsequent operations. However, it shall be understood that the first and second stage of operation of the first mechanism 40 may be fully or partly applied simultaneously. However, subsequent operation first sub step and second sub step are preferable in that the first sub step fixes the position of the clamp device at the damage part of the tube section.

Figure 4D:
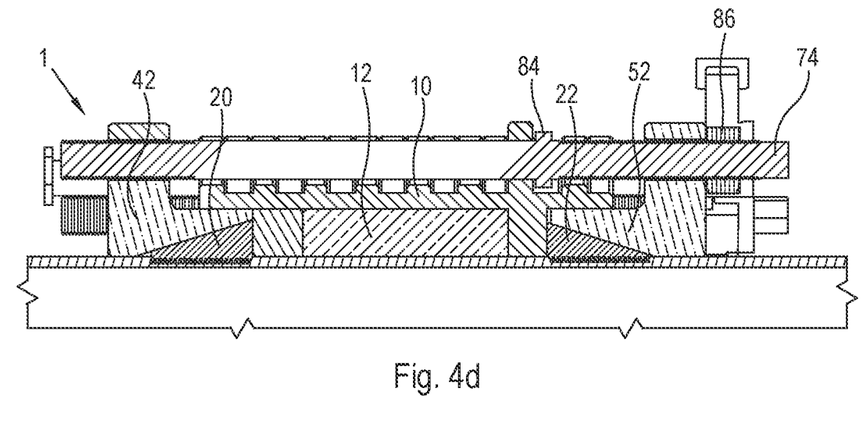
FIG. 4d discloses the clamp device in FIG. 4a subsequent to a second step of operation.

In FIG. 4d is the clamp device 1 in FIG. 4a subsequent to a second step of operation disclosed. Corresponding, the second step comprises a first sub-step of engaging the second engagement member 22, and a second sub-step of inducing the compressive force between the first engagement member 20 and the second engagement member 22. FIG. 4d, is disclosing the situation subsequent to the second sub step of the second step of operation disclosed. That is, the final stage of operation of the clamp device 1.

The second engagement member 22 has formed an engagement with the second part 32 of the pipe section 3. This is schematically illustrated by the second engagement member 22 slightly displaced into the second part 32 of the pipe section 3. Simultaneously, the second engagement member 22 is displaced in direction of the first engagement member 20, compressing the tube section. For the purpose of preventing crack propagation, the displacement of the second engagement member 22 is small and is not visible in FIG. 4d.

The invention has the advantage of enabling repair of damaged parts 2 of tube sections 3 while preventing further degradation of the damaged parts 2.

In the disclosed embodiment in FIG. 2, the first displacement member 42 comprises a first primary wedged portion 60a and the first engagement member 20 comprises a first secondary wedged portion 60b. The first primary wedged portion 60a and the first secondary wedged portion 60b are complementary in shape. By means of a displacement of the first displacement member 42, the first engagement member 20 forms a wedged connection with the first part 30 of the tube section 3. The wedged connection provides a firm connection between the first engagement member 20 and the first part 30 of the tube section 3.

Preferably, a contact portion 61 of the first engagement member 20 is provided with a serrated surface for further improving the engagement between the first engagement member 20 and the first part 30 of the tube section 3.

With reference to the discussion to FIGS. 4b and 4c above, the features of the first primary wedged portion 60a and the first secondary wedged portion 60b have further the advantage of configuring the first sub-step of engaging the first engagement member 20 and the second sub-step of compressing the patch member 12 to be consecutive in order.

In the disclosed embodiment in FIG. 2, correspondingly, the second displacement member 52 comprises a second primary wedged portion 62a and the second engagement member 22 comprises a second secondary wedged portion 62b. The second primary wedged portion 62a and the second secondary wedged portion 62b are complementary in shape. By means of a displacement of the second displacement member 52, the second engagement member 22 forms a wedged connection with the second part 32 of the tube section 3.

Preferably, a contact portion 63 of the second engagement member 22 is correspondingly provided with a serrated surface for further improving the engagement between the second engagement member 22 and the second part 32 of the tube section 3.

With reference to the discussion to FIG. 4d above, the features of the second primary wedged portion 62a and the second secondary wedged portion 62b have further the advantage of configuring the first sub-step of engaging the second engagement member 22 and the second sub-step of inducing a compressive force between the first engagement member 20 and the second engagement member 22 to be consecutive in order.

In the disclosed embodiment, the first displacement member 42 comprises a first displacement body 70 with a threaded first opening 72 and the clamping arrangement 18 comprises a threaded setting bolt 74 extending through the first opening 72. The threading of the first opening 72 and the setting bolt 74 are corresponding threading engaging with each other. By means of rotating the setting bolt 74, the first displacement member 42 is displaced and thereby acting on the first engagement member 20 and the displaceable portion of the clamping body 10. Accordingly, by mean of the rotation of the setting bolt 74, the first engagement member 20 is engaged with the first portion 30 of the tube section 3 and the patch member 12 is compressed at the damaged part 2 of the tube section 3.

In the disclosed embodiment in FIG. 2, the first displacement member 42 is engaged before the first displacement member 42 acts on the displaceable portion and displaces the displaceable portion in direction towards the second engagement member 22. It shall however be understood that the first displacement member 42 may be configured to indirectly or directly acting on the displaceable portion of the clamping body 10.

The second displacement member 52 comprises a second displacement body 80 with a second opening 82 allowing the setting bolt 74 to pass to the first displacement member 42 without acting on the second opening 82 or without significantly acting on the second opening 82. Hence, the second opening 82 differs from the first opening 72 in that it lacks threading or other that would engage with the setting bolt 74.

Figure 3:
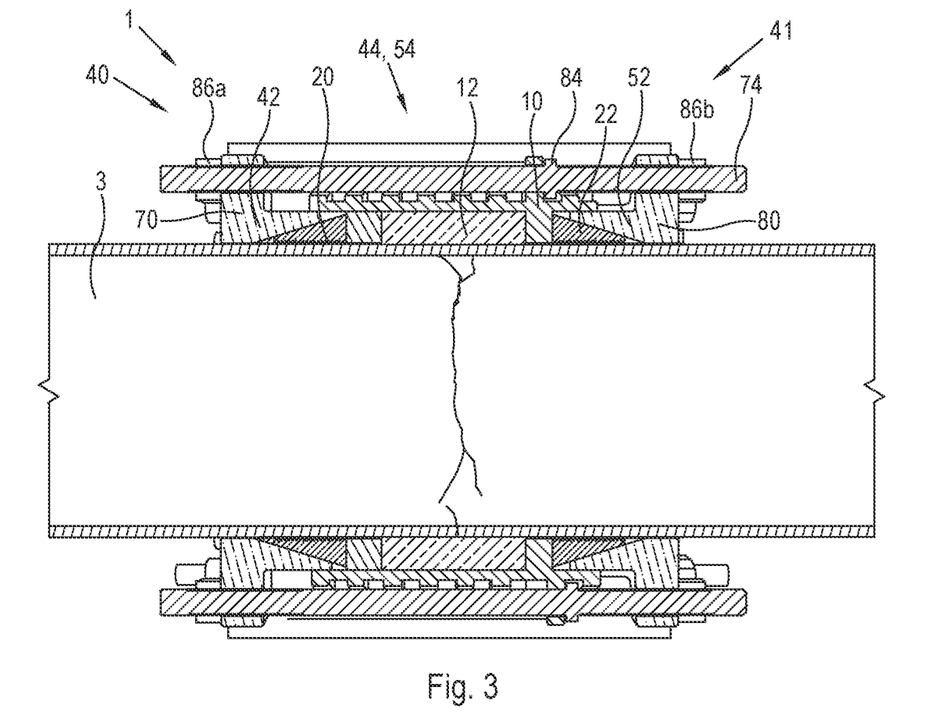
FIG. 3 discloses a cross section of a further embodiment of the clamp device in FIG. 1.

In FIG. 3, a cross second of a further embodiment of the clamp device 1 in FIG. 1 is disclosed. In FIG. 3, a cross section of the full clamp device 1 together with the pipe section 3 is disclosed. The clamp device 1 in FIG. 3 differs from the clamp device 1 in FIG. 2, in the configuration of the first setting arrangement 44 and the second setting arrangement 54.

In the disclosed embodiment in FIG. 3, the first mechanism 40 and the second mechanism 41 comprise a common threaded setting bolt 74 extending between opposite sides of the clamp device 1. The threaded setting bolt 74 comprising the collar 84 engaging with the clamp body.

The first mechanism 40 is further such that the first displacement member 42 comprises a first displacement body 70 with a first opening 72. The first opening 72 allows the setting bolt 74 to pass to the second displacement member 52 without acting on the first opening 72 or without significantly acting on the first opening 72. The first mechanism 40 further comprises a first setting nut 86a at an end of the setting bolt 74 engaging with first displacement member 42. By means of rotating the first setting nut 86a, the first displacement member 42 is displaced and thereby acting on the first engagement member 20. Thereby, the first engagement member 20 is engaged with the first portion 30 of the tube section 3 and the patch member 12 is compressed at the damaged part 2 of the tube section 3.

Correspondingly, the second mechanism 41 is such that the second displacement member 52 comprises a second displacement body 80 with a second opening 82. The second opening 82 allows the setting bolt 74 to pass to the first displacement member 42 without acting on the second opening 82 or without significantly acting on the second opening 82. The second mechanism 41 further comprises a second setting nut 86b at an end of the setting bolt 74 engaging with second displacement member. By means of rotating the second setting nut 86b, the second displacement member 52 is displaced and thereby acting on the second engagement member 22. Thereby, the second engagement member 22 is engaged with the second portion 32 of the tube section 3 and the second engagement member 22 is pushed towards the first engagement member 20.

Figure 5:
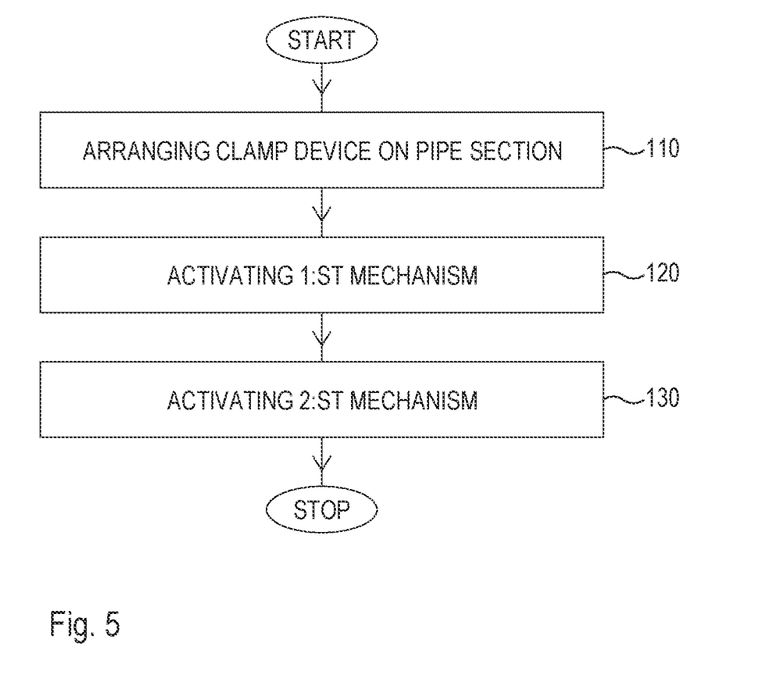
FIG. 5 discloses a flow chart of an embodiment of a method for repairing a damaged part of a pipe section.

FIG. 5 discloses a flow chart of an embodiment of a method for repairing a damaged part 2 of a pipe section 3 by means of a clamp device 1 according to any of above embodiments.

The method is initiated, in a step 110, comprising arranging the clamp device 1 on said damaged part 2 of the pipe section 3 so that the patch member 12 is positioned at the damaged part 2, the first engagement member 20 is positioned at the first part 30 of the pipe section 3, and the second engagement member 22 is positioned at the second part 32 of the pipe section 3. Thereby, the clamp device 1 is ready to be operated on the damaged part 2 on the pipe section 3.

In a step 120, the method comprises activating the first mechanism 40. Thereby, the first engagement member 20 engages with the first part 30 of the pipe section 3 and the patch member 12 is compressed at the damaged part 2. The step 120 have the results that a possible leakage of a medium within the pipe section 3 is prevented.

In a step 130, the method comprises activating the second mechanism 41. Thereby, second engagement member 22 engages with the second part 32 of the pipe section 3 and the second engagement member 22 is pushed toward the first engagement member 20. The step 130 has the result that the crack propagation at the damaged part 2 is prevented.

It should be noted that the above-mentioned embodiments illustrate rather than limit the invention, and that those skilled in the art will be able to design many alternative embodiments without departing from the scope of the appended claims. For example, it shall be understood that the first step and second step of operation are preferably applied subsequent in order. However, the first step and second step of operation maybe be applied simultaneously or at least in part simultaneously.

The invention claimed is:

1. A clamp device for repairing a damaged part of a pipe section, wherein the clamp device is adapted to be arranged at said damaged part, the clamp device comprising:
   a patch member,
   a support structure comprising a clamp body supporting the patch member, a clamping arrangement, a first engagement member configured to engage with a first part of the pipe section adjacent to the damaged part, and a second engagement member configured to engage with a second part of the pipe section adjacent to the damaged part, which first part and second part of the pipe section are on opposite sides of the damaged part in respect to the pipe section, wherein the clamping arrangement comprises a first mechanism, configured in a first step of operation of the clamp device, to engage the first engagement member with the first part of the pipe section and compress the patch member at said damaged part, wherein the clamping arrangement further comprises a second mechanism, configured in a second step of operation of the clamp device, to engage the second engagement member with the second part of the pipe section and induce a compressive force between the first engagement member and the second engagement member, and wherein the clamp body comprises a first wall portion and a second wall portion defining a recess for the patch member, wherein the first wall portion and the second wall portion are displaceable in respect to each other, and wherein the first mechanism is configured to induce a compressive force between the first wall portion and second wall portion, thereby displacing the first wall portion and the second wall portion in respect to each other and compressing the patch member in the recess at said damaged part.

2. The clamp device according to claim 1, wherein the first mechanism comprises a first displacement member and a first setting arrangement for inducing a displacement of the first displacement member from an outside of the clamp device, and wherein the first displacement member is configured to act on the first engagement member and the patch member, thereby engaging the first engagement member with the first part of the pipe section and compressing the patch member.

3. The clamp device according to claim 2, wherein the first displacement member comprises a first primary wedged portion and the first engagement member comprises a first secondary wedged portion complementary to the first primary wedged portion, and wherein the first displacement member is configured to be displaced so that the first primary wedged portion acts on the first secondary wedged portion, thereby engaging the first engagement member with the first part of the pipe section.

4. The clamp device according to claim 1, wherein the first mechanism comprises a first compression member acting on the first wall portion and second compression member acting on the second wall portion, and wherein the first mechanism is configured to induce a force that pushes the first compression member and the second compression member together.

5. The clamp device according to claim 1, wherein the second mechanism is configured to engage the second engagement member with the second part of the pipe section and push one of the first engagement member and the second engagement member toward the other of the first engagement member and the second engagement member.

6. The clamp device according to claim 2, wherein the second mechanism comprises a second displacement member and a second setting arrangement for inducing a displacement of the second displacement member from an outside of the clamp device, and wherein the second displacement member is configured to act on the second engagement member, thereby engaging the second engagement member with the second part of the pipe section and pushing the second engagement member toward the first engagement member.

7. The clamp device according to claim 6, wherein the second displacement member comprises a second primary wedged portion and the second engagement member comprises a second secondary wedged portion complementary to the second primary wedged portion, and wherein the second displacement member is configured to be displaced so that the second primary wedged portion acts on the second secondary wedged portion, thereby engaging the second engagement member with the second part of the pipe section.

8. The clamp device according to claim 6, wherein one of the first displacement member and the second displacement member comprises a first displacement body with a threaded first opening, wherein the clamping arrangement comprises a threaded setting bolt extending through the threaded first opening, which setting bolt comprises a collar engaging with the clamp body, thereby inducing a displacement of said first displacement member or said second displacement member upon rotation of the setting bolt, wherein the other of the first displacement member and the second displacement member comprises a second displacement body with a second opening, wherein the clamping arrangement comprises a setting nut on the setting bolt configured to engage with other of the first displacement member and the second displacement member, thereby inducing a displacement of other of the first displacement member and the second displacement member upon rotation of the setting nut.

9. The clamp device according to claim 8, wherein an end of the setting bolt extends to an outside of the clamp device and the setting nut is arranged at said end of the setting bolt.

10. The clamp device according to claim 6, wherein the first displacement member comprises a first displacement body with a first opening, and wherein the first mechanism comprises a threaded setting bolt comprising a collar engaging with the clamp body and a first setting nut on the threaded setting bolt configured to engage with the first displacement member, thereby inducing a displacement of the first displacement member upon rotation of the first setting nut.

11. The clamp device according to any of claim 10, wherein the second displacement member comprises a second displacement body with a second opening, and wherein the second mechanism comprises a threaded setting bolt comprising a collar engaging with the clamp body and a second setting nut on the threaded setting bolt configured to engage with second displacement member, thereby inducing a displacement of the second displacement member upon rotation of the second setting nut.

12. The clamp device according to claim 10, wherein a first end of the threaded setting bolt extends to an outside at a first side of the clamp device and the first setting nut is arranged at said first end of the threaded setting bolt, wherein a second end of the threaded setting bolt extends to an outside at a second side of the clamp device and the second setting nut is arranged at said second end of the threaded setting bolt, and wherein the first side and second side are opposite sides of the clamp device.

13. The clamp device according to claim 4, wherein the first mechanism comprises a first displacement member configured to engage with the first wall portion of the clamp body and comprising a first displacement body with a threaded first opening, and wherein the first mechanism further comprises a threaded setting bolt extending through the threaded first opening and a collar configured to engage with the second wall portion of the clamp body, thereby inducing a compressive force between the first wall portion and the second wall portion upon rotation of the threaded setting bolt.

14. The clamp device according to claim 1, wherein said first step and second step of operation are individual steps, where the second step of operation is subsequent to the first step of operation.

15. The clamp device according to claim 1, wherein said first step of operation comprises a first sub-step of engaging the first engagement member and a second sub-step of compressing the patch member, and wherein the second sub-step is subsequent to the first sub-step.

16. The clamp device according to claim 1, wherein said second step of operation comprises a first sub-step of engaging the second engagement member and a second sub-step of inducing a compressive force between the first engagement member and the second engagement member, and wherein the second sub-step is subsequent to the first sub-step.

17. The clamp device according to claim 1, wherein the patch member mainly comprises an elastomer.

18. A method for repairing a damaged part of a pipe section with a clamp device, wherein the clamp device is adapted to be arranged at said damaged part, the clamp device comprising:
- a patch member,
- a support structure comprising a clamp body supporting the patch member,
- a clamping arrangement, a first engagement member configured to engage with a first part of the pipe section adjacent to the damaged part, and a second engagement member configured to engage with a second part of the pipe section adjacent to the damaged part, which first part and second part of the pipe section are on opposite sides of the damaged part in respect to the pipe section,
wherein the clamping arrangement comprises a first mechanism, configured in a first step of operation of the clamp device, to engage the first engagement member with the first part of the pipe section and compress the patch member at said damaged part,
wherein the clamping arrangement further comprises a second mechanism, configured in a second step of operation of the clamp device, to engage the second engagement member with the second part of the pipe section and induce a compressive force between the first engagement member and the second engagement member, and
wherein the clamp body comprises a first wall portion and a second wall portion defining a recess for the patch member, wherein the first wall portion and the second wall portion are displaceable in respect to each other, wherein the first mechanism is configured to induce a compressive force between the first wall portion and second wall portion, thereby displacing the first wall portion and the second wall portion in respect to each other and compressing the patch member in the recess at said damaged part, the method comprising:
- arranging the clamp device on said damaged part of the pipe section so that the patch member is positioned at the damaged part, the first engagement member is positioned at the first part of the pipe section, and the second engagement member is positioned at the second part of the pipe section,
- activating the first mechanism, wherein the first engagement member engages with the first part of the pipe section and the patch member is compressed at said damaged part, and
- activating the second mechanism, wherein the second engagement member engages with the second part of the pipe section and the second engagement member is pushed toward the first engagement member.

* * * * *